Patented July 23, 1946

2,404,560

UNITED STATES PATENT OFFICE 2,404,560

SULPHONES AND METHOD OF PREPARING SAME

Louis L. Bambas, Grosse Pointe Woods, Mich., assignor to Parke, Davis & Company, Detroit, Mich., a corporation of Michigan No Drawing. Application June 13, 1944, Serial No. 540,137

3 Claims. (Cl. 260—239.6)

The invention relates to the preparation of sulphones useful for their therapeutic properties. More particularly the invention relates to compounds having the following general formula

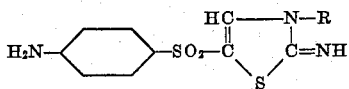

where R is a lower alkyl.

In my application, Serial No. 540,135, filed June 13, 1944, I have disclosed a method for the preparation of 2-amino-4'-nitro-5-thiazolylphenyl sulphone having a melting point of 230–232° C. and the formula

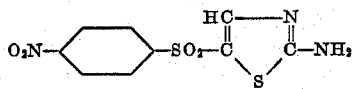

The compounds of the present invention may be prepared by reacting the above mentioned compound in the manner hereinafter set forth.

*Example.—Preparation of 2-imino-3-methyl-4'-nitro-5-thiazolonylphenyl sulphone*

180 grams of 2-amino-4'-nitro-5-thiazolonylphenyl sulphone is heated with 270 grams of dimethyl sulfate on a water bath for 1 hour. The reaction mixture is suspended in water and heated to boiling (95–100° C.). The crude 2-imino-3-methyl-4'-nitro - 5 - thiazolonylphenyl sulphone thereby obtained is reduced with 30 grams of ammonium chloride and 200 grams of reduced iron in 2 liters of water at 80° C. for 1 hour. Care is taken that the temperature does not rise above 80° since the desired compound is relatively unstable at these temperatures. The sludge is cooled and the product is extracted from the iron with alcohol. It is recrystallized from hot dilute alcohol (30%) to give 2-imino-3-methyl-4'-amino-5-thiazolonylphenyl sulphone which on heating blackens at 160° C. and melts at 209–210° C.

In the above example, instead of using dimethyl sulphate, one can use the halide such as methyl iodide or other dialkyl compounds such as diethyl sulphate and others that are readily available to give the corresponding 2-imino-3-alkyl-4'-amino-5-thiazolonylphenyl sulphone.

What I claim as my invention is:

1. A 2-imino-3-lower-alkyl-4'-amino-5-thiazolonyl-phenyl sulphone having the formula

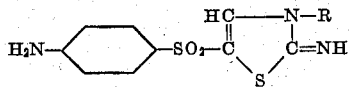

where R is a lower alkyl.

2. 2-imino-3-methyl-4'-amino-5 - thiazolonyl - phenyl sulphone having the formula

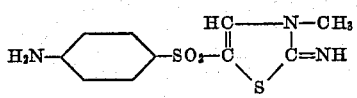

3. The process for preparing a 2-imino-3-lower-alkyl-4'-amino-5 - thiazolonylphenyl sulphone which comprises reacting 2-amino-4'-nitro-5-thiazolonylphenyl sulphone having the formula

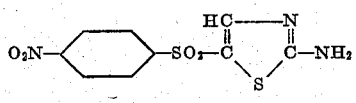

with a di-lower alkyl salt to form 2-imino-3-lower-alkyl-4'- nitro - 5 - thiazolonylphenyl sulphone having the formula

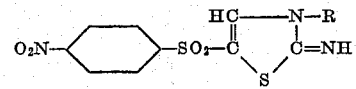

and reducing the latter to obtain 2-imino-3-lower-alkyl-4'-amino - 5 - thiazolonylphenyl sulphone having the formula

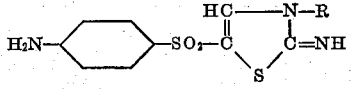

where R is a lower alkyl.

LOUIS L. BAMBAS.